(12) United States Patent
Blake, III et al.

(10) Patent No.: US 10,863,063 B2
(45) Date of Patent: Dec. 8, 2020

(54) DRIVER ASSIST SYSTEM

(71) Applicant: TRW AUTOMOTIVE U.S. LLC, Livonia, MI (US)

(72) Inventors: Thomas E. Blake, III, Novi, MI (US); Michael A. Hart, Dexter, MI (US)

(73) Assignee: TRW AUTOMOTIVE U.S. LLC, Livonia, MI (US)

( * ) Notice: Subject to any disclaimer, the term of this patent is extended or adjusted under 35 U.S.C. 154(b) by 30 days.

(21) Appl. No.: 16/013,107

(22) Filed: Jun. 20, 2018

(65) Prior Publication Data
US 2019/0394365 A1 Dec. 26, 2019

(51) Int. Cl.
*H04N 5/225* (2006.01)
*B60R 11/04* (2006.01)
*B60R 1/00* (2006.01)

(52) U.S. Cl.
CPC ............. *H04N 5/2253* (2013.01); *B60R 1/00* (2013.01); *B60R 11/04* (2013.01)

(58) Field of Classification Search
CPC ................................. H04N 5/2253; B60R 1/00
See application file for complete search history.

(56) References Cited

U.S. PATENT DOCUMENTS

| 2015/0365569 | A1* | 12/2015 | Mai ...................... H04N 5/2252 348/373 |
| 2016/0023620 | A1 | 1/2016 | Matori |
| 2017/0182944 | A1* | 6/2017 | Achenbach .......... H04N 5/2251 |

FOREIGN PATENT DOCUMENTS

JP             2013186278 A    *    9/2013

* cited by examiner

*Primary Examiner* — Girumsew Wendmagegn
(74) *Attorney, Agent, or Firm* — Tarolli, Sundheim, Covell & Tummino LLP (57) ABSTRACT

A driver assist system for a vehicle. The driver assist system includes a bracket having a mounting face. The mounting face is adapted to be attached to a part of the vehicle. The bracket includes a first locating member extending from the mounting face. A module is received in the bracket to secure the module to the part of the vehicle. The module has a camera lens extending from a first face and a first module locating member extending from the first face. One of the first bracket locating member and the first module locating member is linearly received within one other of the first bracket locating member and the first module locating member when the module is received in the bracket to maintain an orientation of the module relative to the bracket.

20 Claims, 7 Drawing Sheets

DRIVER ASSIST SYSTEM

FIELD OF THE INVENTION

The present invention relates to a driver assist system ("DAS") and, in particular, to an arrangement for mounting a DAS in a vehicle.

BACKGROUND TO THE INVENTION

It is known to provide a vehicle with a DAS. A DAS typically includes a camera that is attached to a vehicle and has a field of view of an area outside the vehicle. The DAS monitors the environment surrounding the vehicle and provides other vehicle systems with information relating to the surrounding environment to aid in operation of the vehicle. The DAS can, for example, monitor for a potential vehicle collision condition, a lane or roadway departure occurrence, road sign information, pedestrian information, and/or traffic information.

Typically, an output of the camera is analyzed by a controller of the DAS. The controller uses the analyzed output to interact with other vehicle systems which, in turn, can provide a vehicle operator with warnings, haptic tactile feedback, and/or autonomous vehicle control.

A robust mounting arrangement between the DAS and the vehicle helps ensure that the output of the camera accurately reflects the surrounding vehicle environment. Camera output can be compromised by an unstable mounting arrangement.

SUMMARY OF THE INVENTION

According to one aspect of the invention, a driver assist system for a vehicle includes a bracket having a mounting face. The mounting face is adapted to be attached to a part of the vehicle. The bracket includes a first locating member extending from the mounting face. A module is received in the bracket to secure the module to the part of the vehicle. The module has a camera lens extending from a first face and a first module locating member extending from the first face. One of the first bracket locating member and the first module locating member is linearly received within one other of the first bracket locating member and the first module locating member when the module is received in the bracket to maintain an orientation of the module relative to the bracket.

BRIEF DESCRIPTION OF THE DRAWINGS

Embodiments of the invention will now be described by way of example only, with reference to the accompanying drawings, in which.

DETAILED DESCRIPTION

A DAS 100 includes a bracket 102 and a module 104. The bracket 102 can be attached to a part of a vehicle (e.g., windshield) and receive the module 104 to secure the module 104 to the vehicle part. The bracket 102 (FIGS. 1-4) includes a mounting face 112 and a viewing channel 114. The mounting face 112 is adapted to be attached to the vehicle part. The viewing channel 114 is defined by a rear wall 116, sidewalls 118, and a bottom wall 120. The rear wall 116 and each of the sidewalls 118 extend from the mounting face 112. The rear wall 116 spaces the sidewalls 118 apart from one another. The bottom wall 120 interconnects each of the sidewalls 118 and the rear wall 116 to one another. A lens aperture 122 is formed on the bracket 102. The lens aperture 122 extends through the rear wall 116 and the mounting face 112.

The bracket 102 is provided with a retainer 124 for helping retain the module 104 in the bracket 102. The retainer 124 includes a resilient tab 126 that extends from the mounting face 112. A ramp like projection 128 is provided on the tab 126. The projection 128 includes an inclined surface 130 that terminates at a retention face 132.

First and second bracket locating members 134a, 134b extend from the viewing channel 114 along respective longitudinal axes 136a, 136b. The first and second bracket locating members 134a, 134b are equally spaced from the lens aperture 122 on opposite sides of the lens aperture 122.

The first bracket locating member 134a is formed as a channel having a substantially T-shaped cross section. The first bracket locating member 134a includes a first portion 137a and a second portion 139a extending generally perpendicular to the first portion 137a. The second portion 139a extends from a side of the first portion 137a facing away from the lens aperture 122. In one example, a height $h_1$ and a width $w_1$ of the first bracket locating member 134a tapers along the longitudinal axis 136a of the first bracket locating member 134a in a direction extending toward the viewing channel 114. However, it is contemplated that the height $h_1$ and/or the width $w_1$ of the first bracket locating member 134a can be free from tapering.

The second bracket locating member 134b is formed as a channel having a substantially T-shaped cross section. The second bracket locating member 134b includes a first portion 137b and a second portion 139b extending generally perpendicular to the first portion 137b. The second portion 139b extends from a side of the first portion 137b facing away from the lens aperture 122. In one example, a height $h_2$ and a width $w_2$ of the second bracket locating member 134b tapers along the longitudinal axis 136b of the second bracket locating member 134b in a direction extending toward the viewing channel 114. However, it is contemplated that the height $h_2$ and/or the width $w_2$ of the second bracket locating member 134b can be free from tapering.

The first portions 137a, 137b of the respective first and second bracket locating members 134a, 134b extend substantially parallel to one another. The second portions 139a, 139b of the respective first and second bracket locating members 134a, 134b are coplanar.

The module 104 (FIGS. 1, 2, 5, and 6) has first and second opposite faces 140, 142. A camera lens 144 extends from the first face 140. The module 104 includes connection ports 146 that can be used to provide power to the module 104 and/or transmit output from the camera lens 144 to vehicle circuitry (not shown). A heat exchanger 148 is provided on the first and second faces 140, 142. The heat exchanger 148 is formed as a plurality of fins 150 that are configured to dissipate heat generated by the module 104. It is contemplated that the heat exchanger 148 can be provided only on the first face 140 or only on the second face 142. A ramped portion 152 is provided on the module 104. The ramped portion 152 includes an inclined surface 156 that terminates at a retention face 158.

First and second module locating members 160a, 160b extend from the first face 140 of the module 104 along respective longitudinal axes 162a, 162b. The first and second module locating members 160a, 160b are equally spaced from the camera lens 144 on opposite sides of the camera lens 144.

The first module locating member 160a is formed as a projection having a substantially T-shaped cross section. The first module locating member 160a includes a first portion 163a and a second portion 165a extending generally perpendicular to the first portion 163a. The second portion 165a extends from a side of the first portion 165a facing away from the camera lens 144. In one example, a height $h_3$ and a width $w_3$ of the first module locating member 160a tapers along the longitudinal axis 162 of the first module locating member 160a in a direction extending away from the first face 140. However, it is contemplated that the height $h_3$ and/or the width $w_3$ of the first module locating member 160a can be free from tapering.

The second module locating member 160b is formed as a projection having a substantially T-shaped cross section. The second module locating member 160b includes a first portion 163b and a second portion 165b extending generally perpendicular to the first portion 163b. The second portion 165b extends from a side of the first portion 165b facing away from the camera lens 144. In one example, a height $h_4$ and a width $w_4$ of the second module locating member 160b tapers along the longitudinal axis 162b of the second module locating member 160b in a direction extending away from the first face 140. However, it is contemplated that the height $h_4$ and/or the width $w_4$ of the second module locating member 160b can be free from tapering.

The first portions 163a, 163b of the respective first and second module locating members 160a, 160b extend substantially parallel to one another. The second portions 165a, 165b of the respective first and second module locating members 160a, 160b are coplanar.

Figure 1:
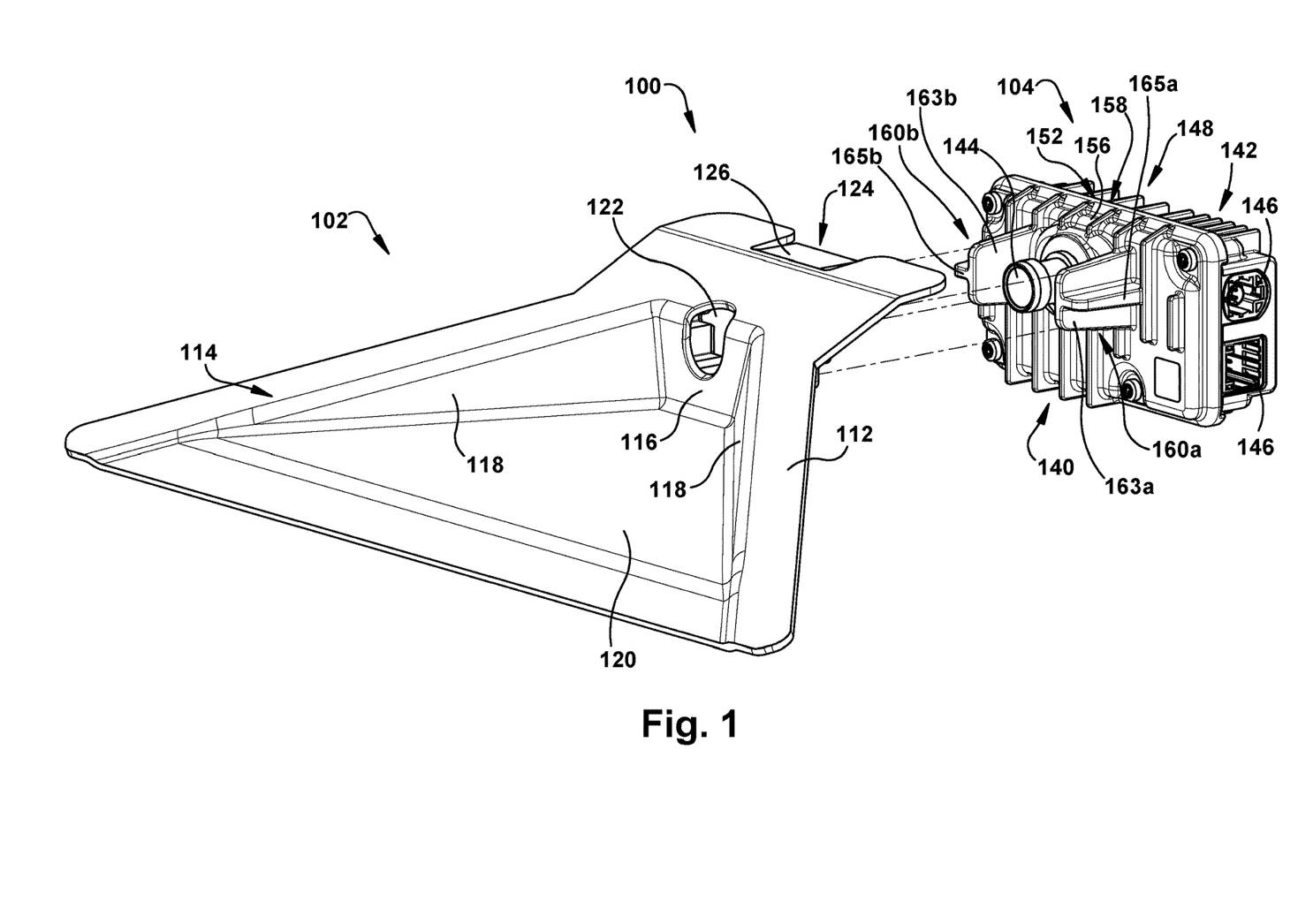
FIG. 1 is an exploded perspective view of a DAS of the present invention.
Figure 2:
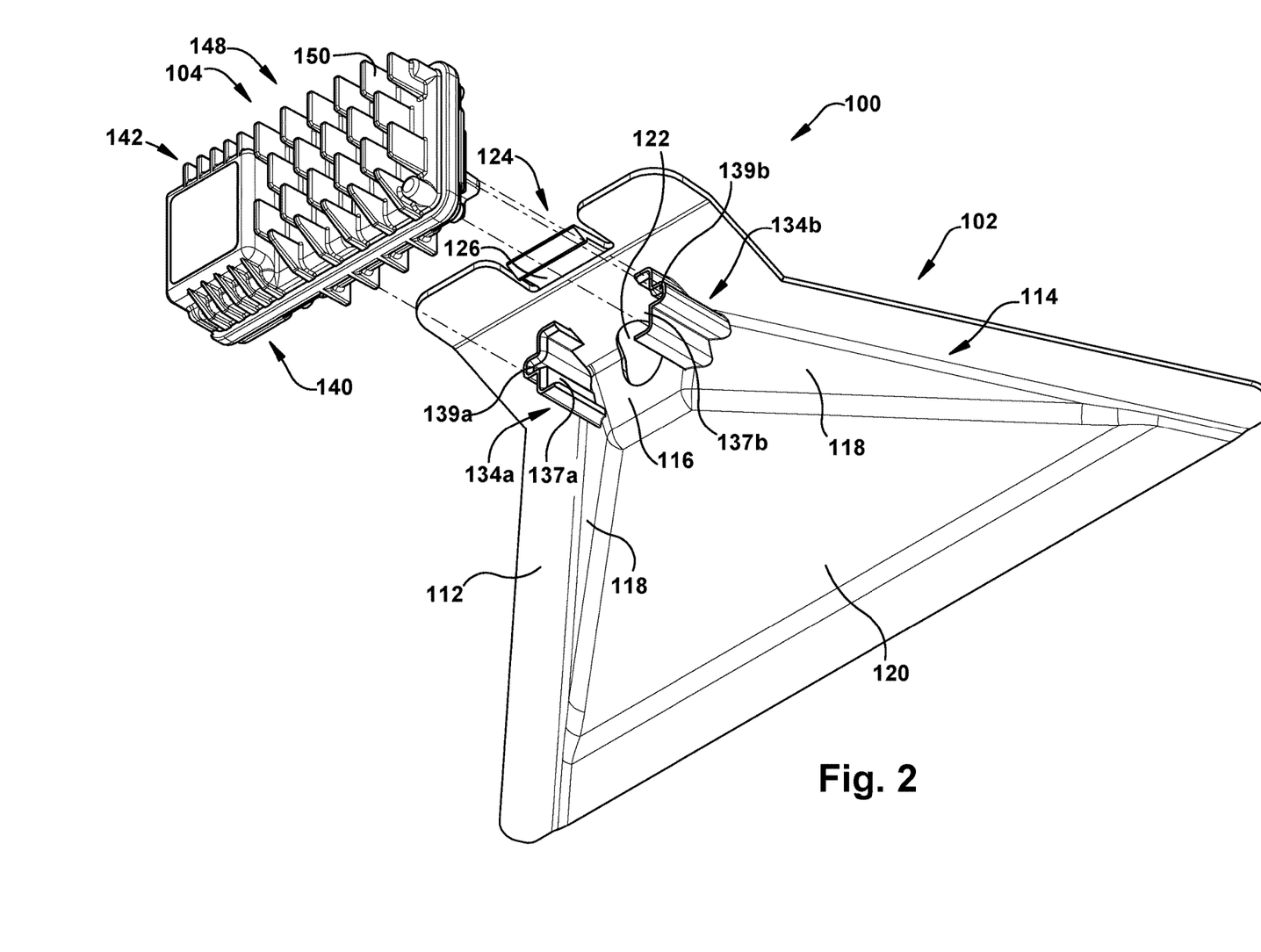
FIG. 2 is a different exploded perspective view of the DAS of FIG. 1.
Figure 3:
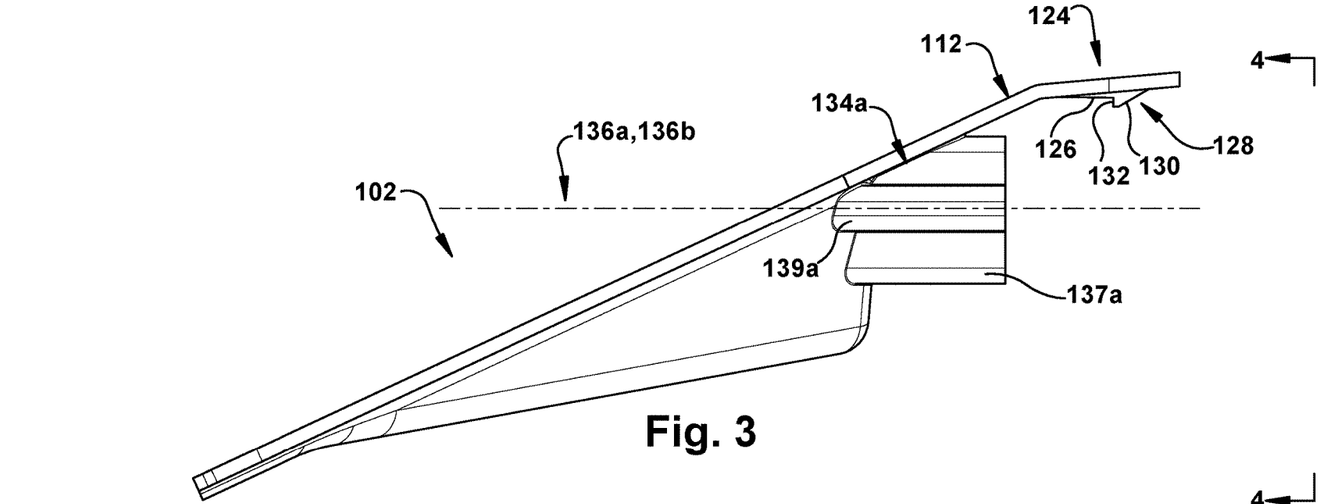
FIG. 3 is a side view of a bracket of the DAS of FIG. 1.
Figure 4:
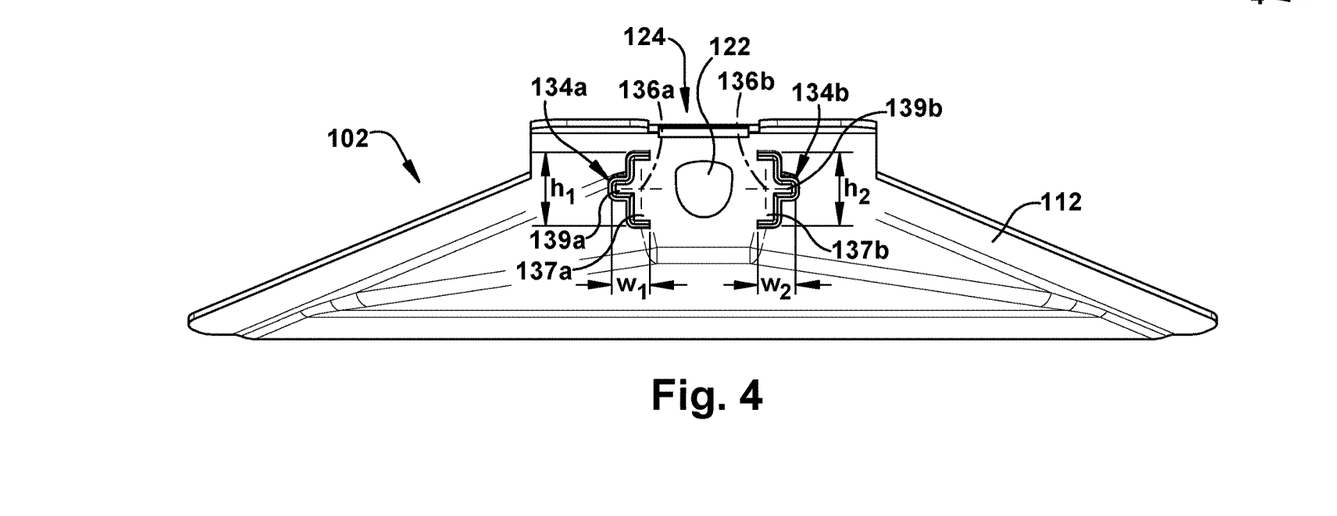
FIG. 4 is a view along 4-4 of FIG. 2.
Figure 5:
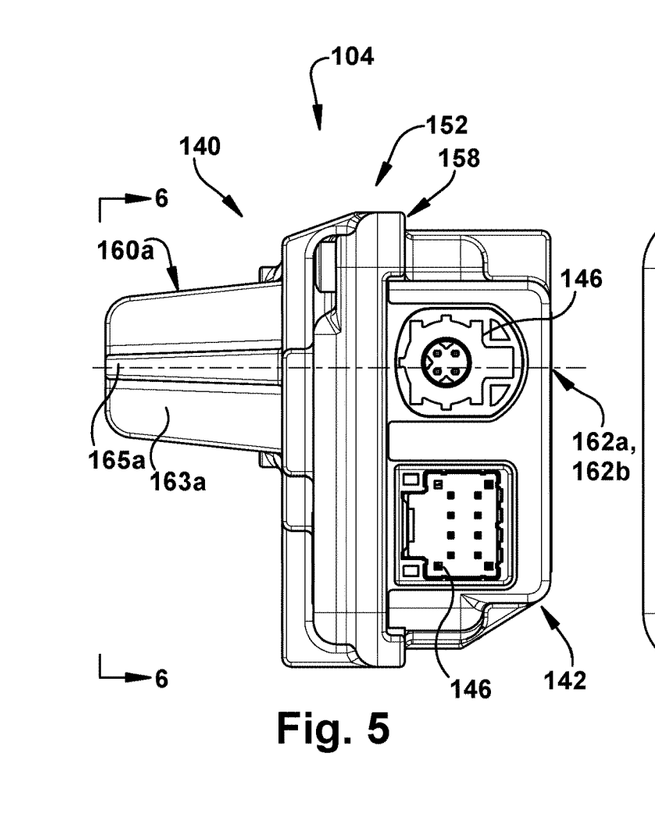
FIG. 5 is a side view of a module of the DAS of FIG. 1.
Figure 6:
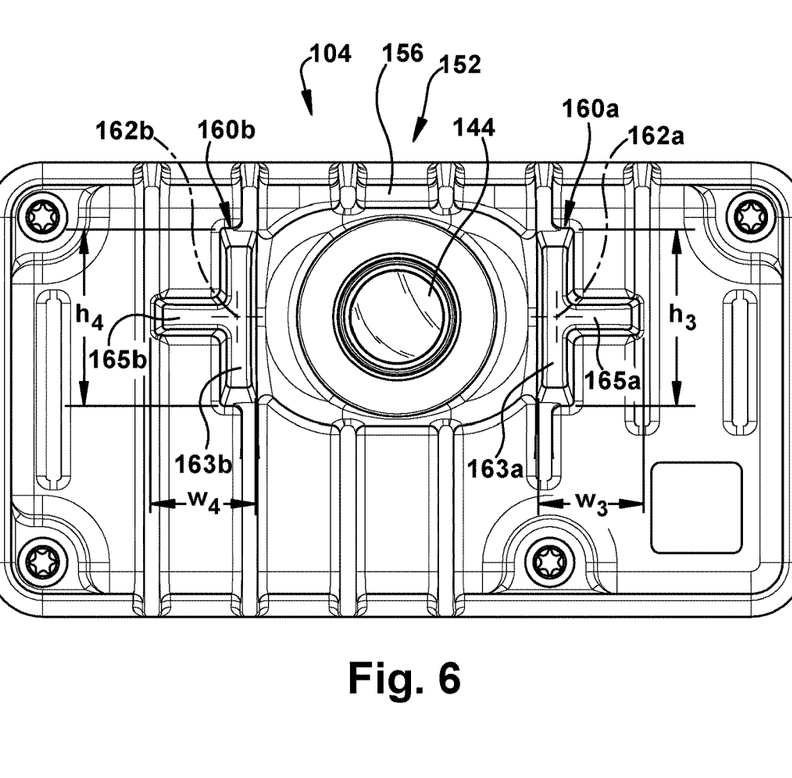
FIG. 6 is a view along 6-6 of FIG. 5.
Figure 7A:
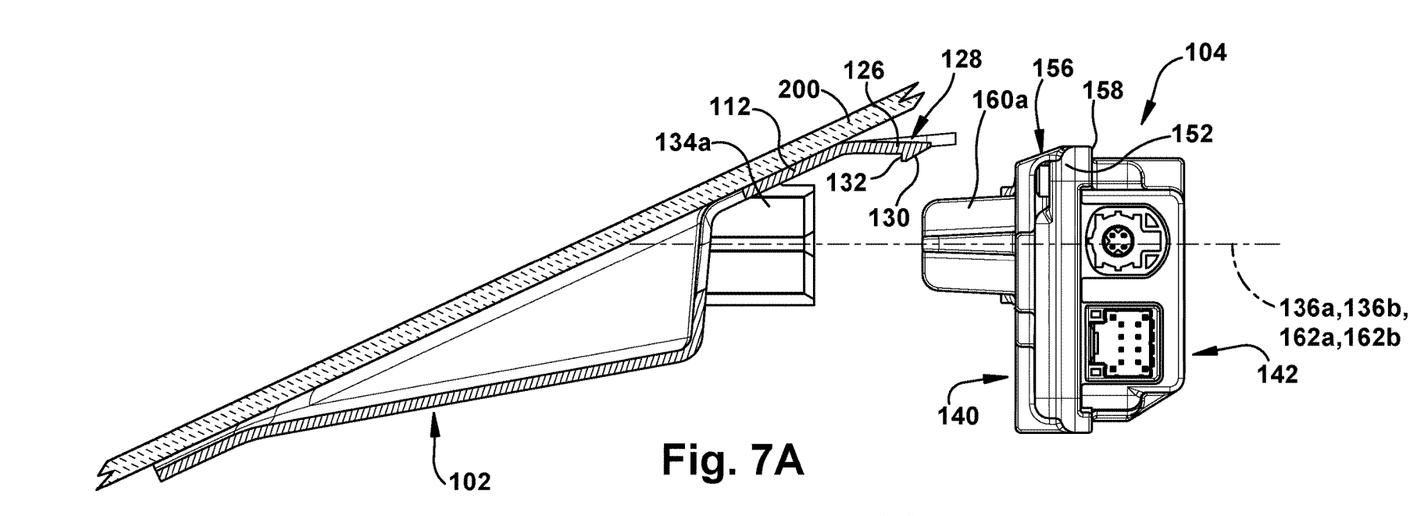
FIGS. 7A-7D are side views of the DAS of FIG. 1 during various steps of using the bracket to attach the module to a vehicle windshield.
Figure 7B:
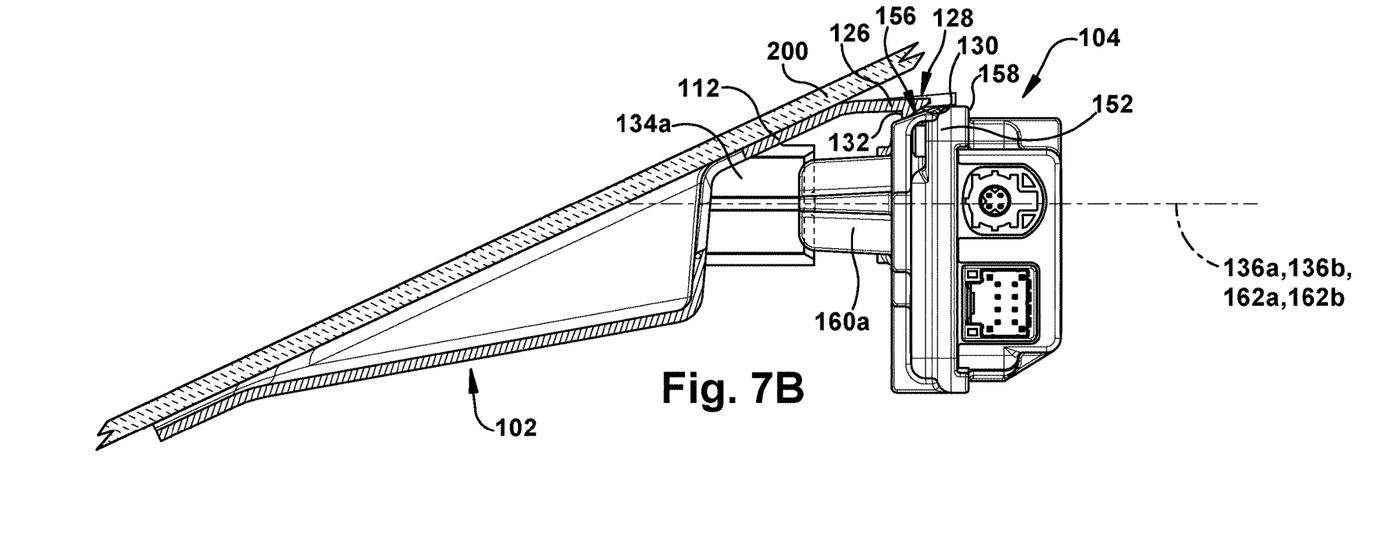

Steps of using the bracket 102 to secure the module 104 to a part of a vehicle are shown in FIGS. 7A-7D. First, the mounting face 112 is attached to a part 200 of a vehicle using any desired fastening arrangement (e.g., adhesive, mechanical fasteners, etc.). In one example, the vehicle part 200 is a windshield. However, it is contemplated that the vehicle part 200 can be any other part of a vehicle. Next the axis 162a of the first module locating member 160a is aligned with the axis 136a of the first bracket locating member 134a and the axis 162b of the second module locating member 160b is aligned with the axis 136b of the second bracket locating member 134b (FIG. 7A). While maintaining these alignments, the module 104 is advanced toward the bracket 102 until the first module locating member 160a engages the first bracket locating member 134a and the second module locating member 160b engages the second bracket locating member 134b (FIG. 7B). The first and second bracket locating members 134a, 134b linearly receive the first and second module locating members 160a, 160b, respectively, as the module 104 continues to be advanced relative to the bracket 102.

The T-shaped cross section of the first and second module locating members 160a, 160b cooperates with the T-shaped cross section of the first and second bracket locating members 134a, 134b to maintain the orientation of the module 104 relative to the bracket 102. Additionally, the taper of the first and second module locating members 160a, 160b cooperates with the taper of the first and second bracket locating members 134a, 134b to assist in guiding movement of the module 104 relative to the bracket 102 as the module 104 is advanced.

Figure 7C:
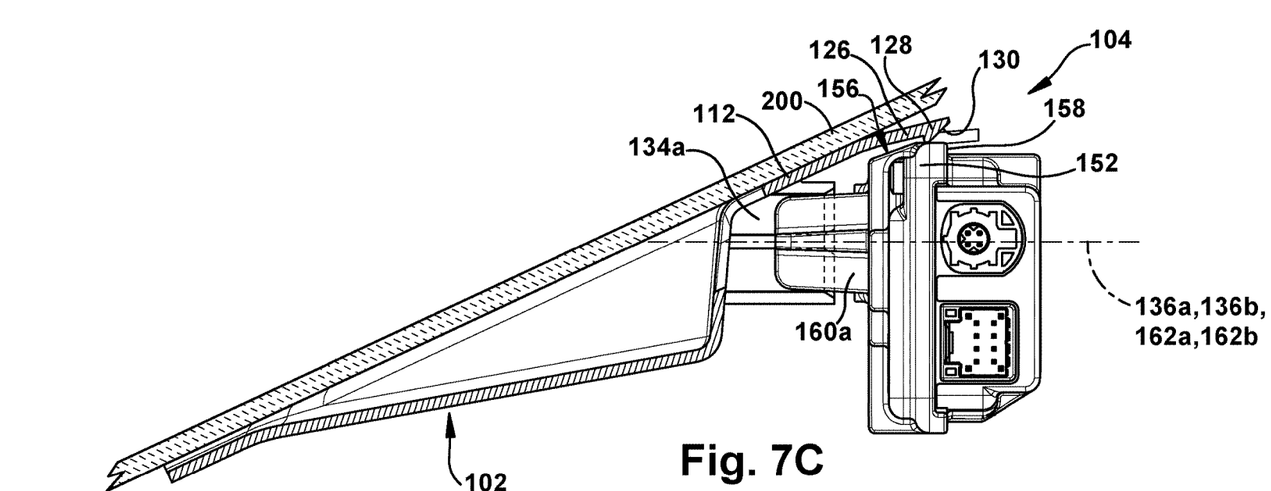
Figure 7D:
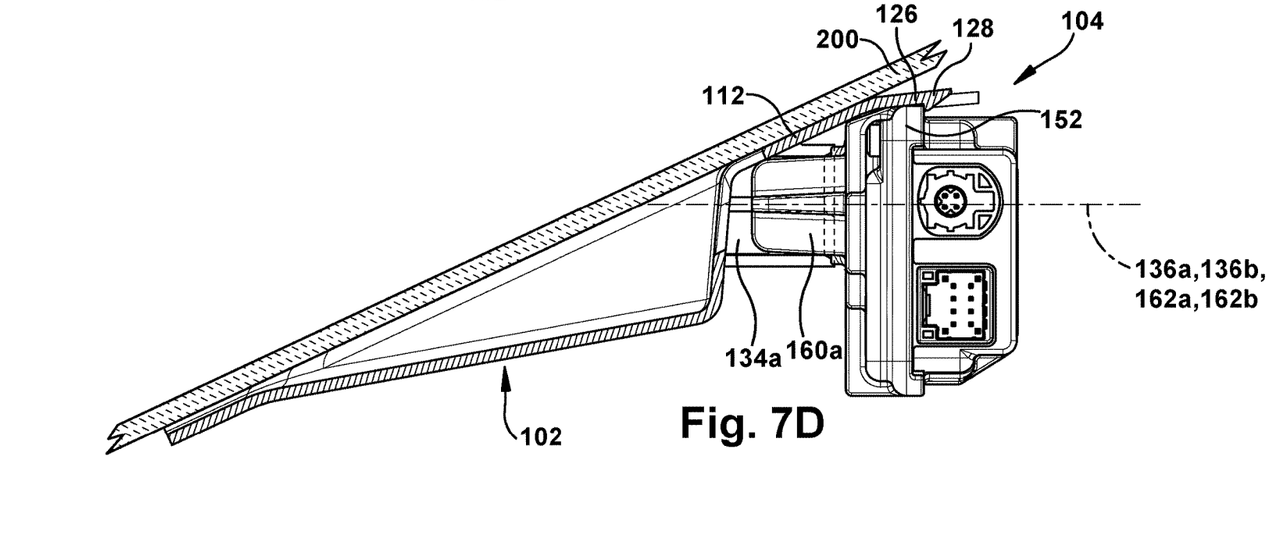

The inclined surface 156 on the module 104 engages the inclined surface 130 on the bracket 102 during insertion of the first and second module locating members 160a, 160b into the first and second bracket locating members 134a, 134b, respectively. Continued advancement of the module 104 relative to the bracket 102 causes the resilient tab 126 to move relative to the rest of the bracket 102 (FIG. 7C). This movement of the tab 126 allows the ramped portion 152 of the module 104 to pass by the projection 128 of the bracket 102. The tab 126 returns to its original position relative to the bracket 102 once the ramped portion 152 clears the projection 128 (FIG. 7D). The retention face 132 of the bracket 102 engages the retention face 158 of the module 104 as the tab 126 returns to its original position. The engagement between the retention faces 132, 158 retains the module 104 in the bracket 102 and prevents the module 104 from moving away from the bracket 102. The first and second module locating members 160a, 160b engage the mounting face 112 when the retention faces 132, 158 engage one another. The engagement of the first and second module locating members 160a, 160b with the mounting face 112 prevents the module 104 from moving toward the windshield 200. In one example, the taper of the first and second module locating members 160a, 160b and the taper of the first and second bracket locating members 134a, 134b are dimensioned and configured to create an interference fit between a respective one of the module locating members 160a, 160b and the bracket locating members 134a, 134b. This interference fit further prevents movement of the module 104 relative to the bracket 102. However, it is contemplated that the first bracket locating member 134a, the second bracket locating member 134b, the first module locating member 160a, and/or the second module locating member 160b can be dimensioned and configured such that no interference fit is created.

Figure 8:
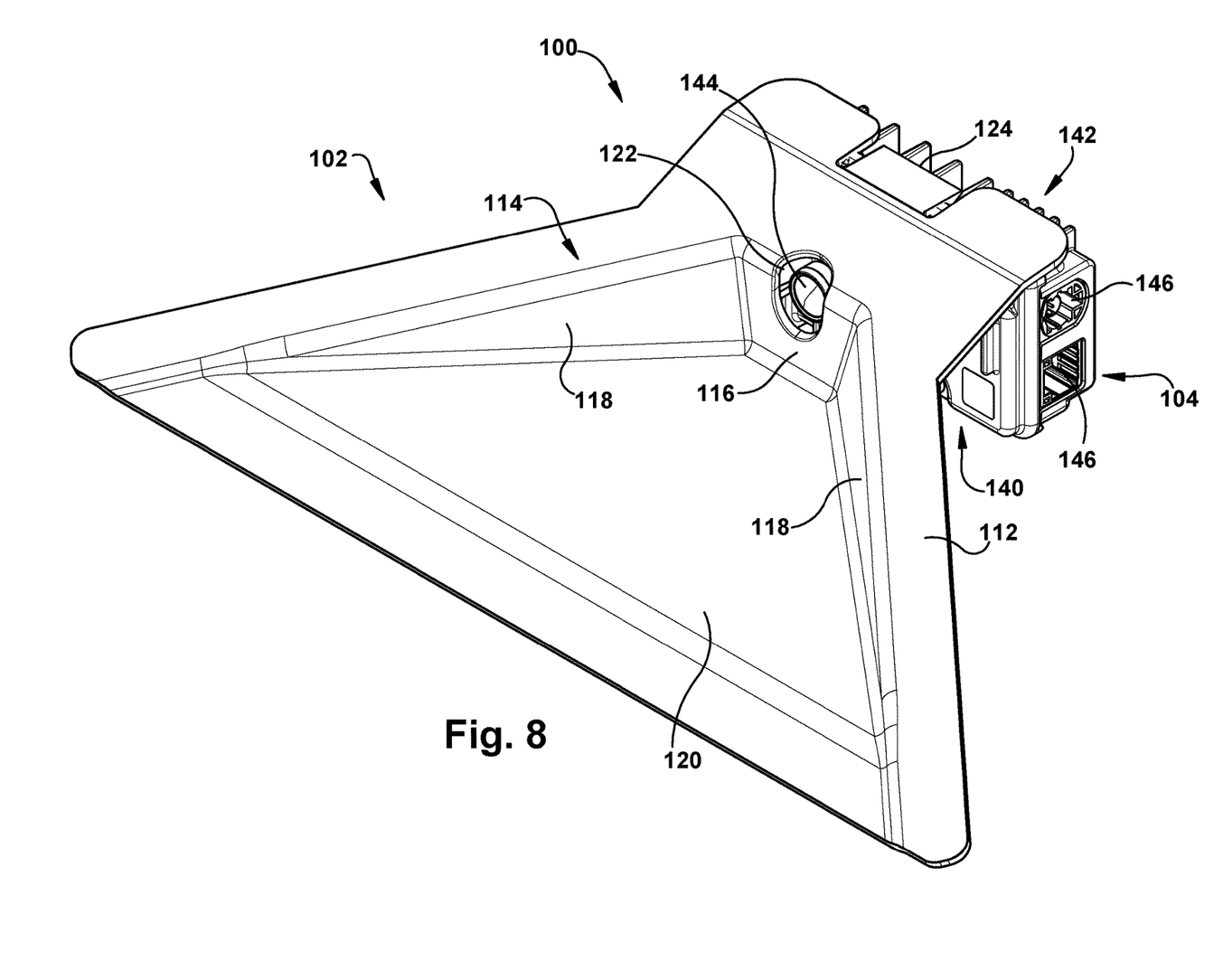
FIG. 8 is an assembled perspective view of the DAS of FIG. 1.

The camera lens 144 is aligned with the lens aperture 122 when the module 104 is retained by the bracket 102 (FIG. 8). The camera lens 144 looks through the lens aperture 122 and the viewing channel 114 to provide the module 104 with a view in front of the vehicle through the windshield 200. It is contemplated that the bracket 102 can be used to secure the module 104 to any part of the vehicle to provide any desired view (e.g., view behind the vehicle, view in the vehicle interior).

What have been described above are examples of the disclosure. It is, of course, not possible to describe every conceivable combination of components or method for purposes of describing the disclosure, but one of ordinary skill in the art will recognize that many further combinations and permutations of the disclosure are possible. For example, the first and second bracket locating members 134a, 134b can be provided as projections and the first and second module locating members 160a, 160b can be provided as channels. As another example, the first bracket locating member 134a, the second bracket locating member 134b, the first module locating member 160a, and/or the second module locating member 160b can have any desired cross section other than T-shaped. Furthermore, a greater or fewer number of locating members can be provided at any desired location on the bracket 102 and/or the module 104. As yet another example, a greater or fewer number of projections 128 and/or ramped portions 152 can be provided at any desired location on the bracket 102 and/or the module 104. Accordingly, the disclosure is intended to embrace all such alterations, modifications, and variations that fall within the scope of this application, including the appended claims.

The invention claimed is:

1. A driver assist system for a vehicle, the driver assist system comprising:
a bracket having a mounting face, the mounting face being adapted to be attached to a part of the vehicle, the bracket including a first bracket locating member extending from the mounting face; and
a module that is received in the bracket to secure the module to the part of the vehicle, the module having a camera lens extending from a first face and a first module locating member extending from the first face;
wherein one of the first bracket locating member and the first module locating member is linearly received within one other of the first bracket locating member and the first module locating member when the module is received in the bracket to maintain an orientation of the module relative to the bracket, at least one of a height and a width of the first bracket locating member being tapered in a direction extending along a longitudinal axis of the first bracket locating member.

2. The driver assist system of claim 1, wherein the first bracket locating member is formed as a channel and wherein the first module locating member is formed as a projection that is received within the channel.

3. The driver assist system of claim 1, wherein the first bracket locating member is formed as a projection and wherein the first module locating member is formed as a channel that receives the projection.

4. The driver assist system of claim 1, wherein the bracket includes a ramp like projection and the module includes a ramped portion, the projection and the ramped portion engaging one another to retain the module in the bracket.

5. The driver assist system of claim 4, wherein the projection is provided on a resilient tab that is moveable relative to the rest of the bracket by the ramped portion.

6. The driver assist system of claim 1, wherein each of the first bracket locating member and the first module locating member has a T-shaped cross section.

7. The driver assist system of claim 1, wherein the bracket includes a lens aperture for the camera lens and a second bracket locating member extending from the mounting face, each of the first and second bracket locating members being provided as channels, the first and second bracket locating members being located on opposite sides of the lens aperture.

8. The driver assist system of claim 7, wherein each of the first and second bracket locating members includes a first portion and a second portion extending generally perpendicular to the first portion, the second portion extending from a side of the first portion facing away from the lens aperture.

9. The driver assist system of claim 8, where the first portion of the first bracket locating member extends substantially parallel to the first portion of the second bracket locating member.

10. The driver assist system of claim 8, wherein the second portion of the first bracket locating member is coplanar with the second portion of the second bracket locating member.

11. The driver assist system of claim 1, wherein the module includes a second module locating member extending from the first face, each of the first and second module locating members being provided as projections, the first and second module locating members being located on opposite sides of the camera lens.

12. The driver assist system of claim 11, wherein each of the first and second module locating members includes a first portion and a second portion extending generally perpendicular to the first portion, the second portion extending from a side of the first portion facing away from the camera lens.

13. The driver assist system of claim 12, where the first portion of the first module locating member extends substantially parallel to the first portion of the second module locating member.

14. The driver assist system of claim 12, wherein the second portion of the first module locating member is coplanar with the second portion of the second module locating member.

15. The driver assist system of claim 1, wherein at least one of a height and a width of the first module locating member is tapered in a direction extending along a longitudinal axis of the first module locating member.

16. The driver assist system of claim 1, wherein the module has a second face that is opposite to the first face, and wherein a plurality of fins that are adapted to dissipate heat generated by the module are provided on at least one of the first face and the second face.

17. A driver assist system for a vehicle, the driver assist system comprising:
a bracket having a mounting face, the mounting face being adapted to be attached to a part of the vehicle, the bracket including a first bracket locating member extending from the mounting face, the first bracket locating member being formed as a projection; and
a module that is received in the bracket to secure the module to the part of the vehicle, the module having a camera lens extending from a first face and a first module locating member extending from the first face, the first module locating member being formed as a channel that receives the projection;
wherein one of the first bracket locating member and the first module locating member is linearly received within one other of the first bracket locating member and the first module locating member when the module is received in the bracket to maintain an orientation of the module relative to the bracket.

18. A driver assist system for a vehicle, the driver assist system comprising:
a bracket having a mounting face, the mounting face being adapted to be attached to a part of the vehicle, the bracket including a first bracket locating member extending from the mounting face; and
a module that is received in the bracket to secure the module to the part of the vehicle, the module having a camera lens extending from a first face and a first module locating member extending from the first face;
wherein one of the first bracket locating member and the first module locating member is linearly received within one other of the first bracket locating member and the first module locating member when the module is received in the bracket to maintain an orientation of the module relative to the bracket, each of the first bracket locating member and the first module locating member having a T-shaped cross section.

19. The driver assist system of claim 18, wherein the first bracket locating member is formed as a channel and wherein the first module locating member is formed as a projection that is received within the channel.

20. The driver assist system of claim 18, wherein the bracket includes a lens aperture for the camera lens and a second bracket locating member extending from the mounting face, each of the first and second bracket locating members being provided as channels, the first and second bracket locating members being located on opposite sides of the lens aperture, each of the first and second bracket locating members having a first portion and a second portion extending generally perpendicular to the first portion, the second portion extending from a side of the first portion facing away from the lens aperture, the module including a second module locating member extending from the first face, each of the first and second module locating members being provided as projections, the first and second module locating members being located on opposite sides of the camera lens, each of the first and second module locating members having a first portion and a second portion extending generally perpendicular to the first portion, the second portion extending from a side of the first portion facing away from the camera lens.

* * * * *